(12) United States Patent
Selvaraj (10) Patent No.: US 12,120,017 B1
(45) Date of Patent: Oct. 15, 2024

(54) EQUAL COST MULTIPATH FORWARDING USING INGRESS PORT

(71) Applicant: Arista Networks, Inc., Santa Clara, CA (US)

(72) Inventor: Satish Kumar Selvaraj, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 18/299,328

(22) Filed: Apr. 12, 2023

(51) Int. Cl.
*H04L 45/24* (2022.01)
*H04L 45/00* (2022.01)

(52) U.S. Cl.
CPC .............. *H04L 45/24* (2013.01); *H04L 45/20* (2013.01); *H04L 45/566* (2013.01)

(58) Field of Classification Search
CPC ........ H04L 45/24; H04L 45/20; H04L 45/566
See application file for complete search history.

(56) References Cited

U.S. PATENT DOCUMENTS

| | | | |
|---|---|---|---|
| 8,355,328 B2* | 1/2013 | Matthews | H04L 45/745 370/395.3 |
| 9,565,114 B1* | 2/2017 | Kabbani | H04L 45/7453 |
| 9,571,400 B1 | 2/2017 | Mandal et al. | |
| 10,084,687 B1* | 9/2018 | Sharif | H04L 45/24 |
| 10,686,695 B1* | 6/2020 | Nainar | H04L 45/48 |
| 10,785,145 B2* | 9/2020 | Kulkarni | H04L 45/123 |
| 2011/0283013 A1* | 11/2011 | Grosser | H04L 61/103 709/232 |
| 2012/0014261 A1* | 1/2012 | Salam | H04L 43/10 370/242 |
| 2012/0134266 A1 | 5/2012 | Roitshtein et al. | |
| 2015/0003255 A1* | 1/2015 | Frost | H04L 45/24 370/238 |
| 2015/0163133 A1* | 6/2015 | Grosser | H04L 45/28 370/400 |
| 2019/0140937 A1* | 5/2019 | Kumar | H04L 45/02 |
| 2020/0007448 A1* | 1/2020 | Mizrahi | H04L 47/125 |
| 2020/0336420 A1* | 10/2020 | Joshi | H04L 47/2433 |

OTHER PUBLICATIONS

European Patent Office, Extended European Search Report, EP App. No. 24160558.3 dated Jul. 16, 2024, 14 pgs.

* cited by examiner

*Primary Examiner* — Dhairya A Patel (74) *Attorney, Agent, or Firm* — Fountainhead Law Group, PC (57) ABSTRACT

ECMP forwarding includes identifying and selecting an ECMP group of equal cost paths to a destination using destination information contained in a received packet. A member from the selected ECMP group is selected based on the ingress port on which the packet was received. The received packet is forwarded on the port that can reach the next hop associated with the selected member.

19 Claims, 9 Drawing Sheets

EQUAL COST MULTIPATH FORWARDING USING INGRESS PORT

BACKGROUND

The present disclosure relates to equal cost multipath (ECMP) forwarding in a network device. ECMP is a forwarding strategy that allows for traffic of the same session or flow (e.g., traffic with the same source and destination) to be transmitted along any one of multiple paths (links) to the destination that are deemed to have equal cost. ECMP forwarding can load balance traffic and increase bandwidth by fully utilizing otherwise unused bandwidth on paths to the same destination.

ECMP forwarding begins when a packet (ingress packet) is received at a given network device. An ECMP group is obtained, for example, based on the destination internet protocol (IP) address in the ingress packet. Each member in the ECMP group represents the next hop on a path to the destination. A hash value is computed from certain fields of the ingress packet. An index is computed from the operation H modulo N, where H is the computed hash value and N is the number of members in the ECMP group. The computed index is used to select one of the member in the ECMP group. The packet is forwarded on a port (the egress port) connected to the next hop identified by the selected member. Depending on the entropy between the flows, oversubscription to an ECMP path can occur, resulting in congestion along that path and underutilization of the other ECMP paths.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
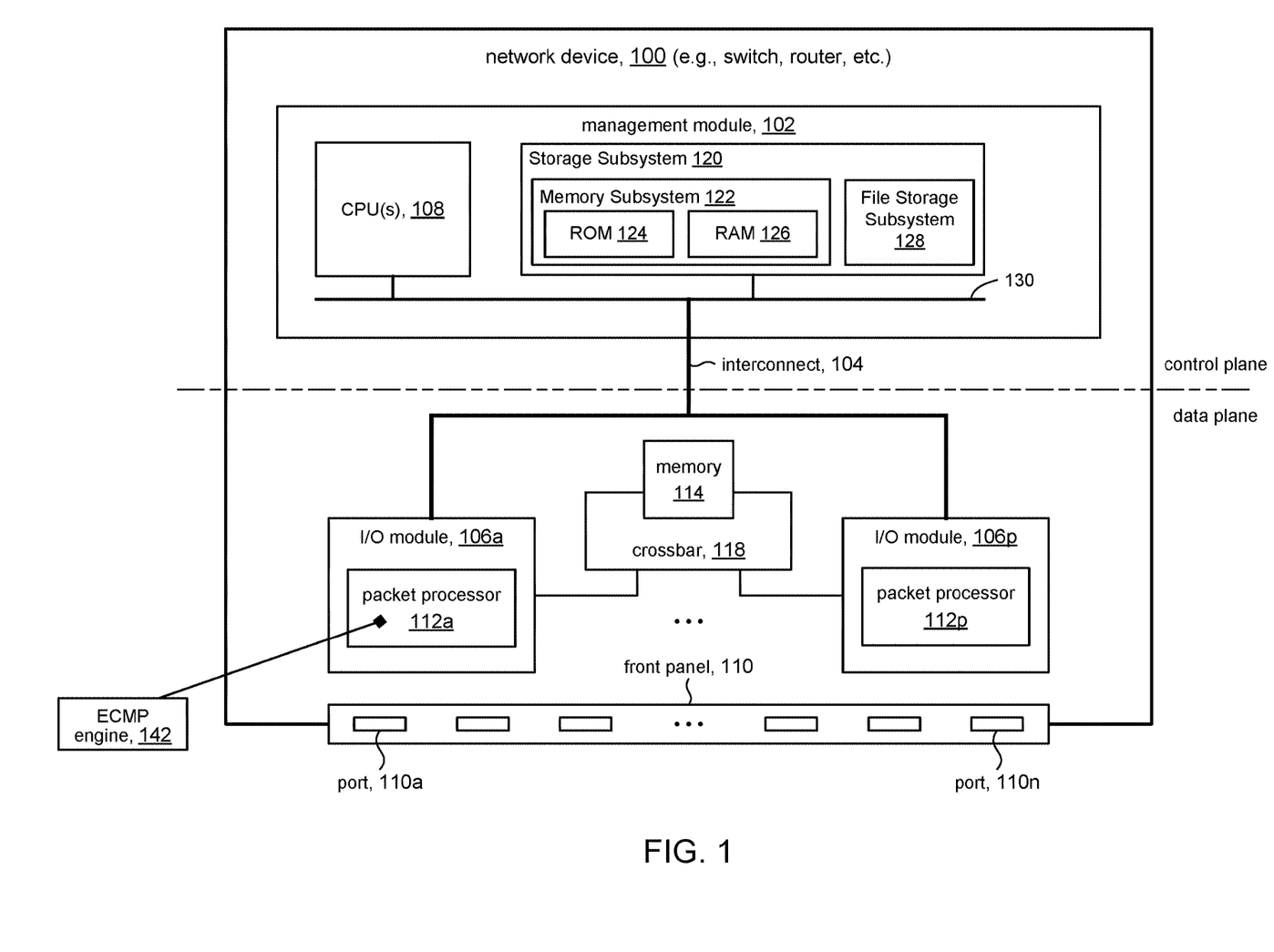
FIG. 1 represents a network device adapted in accordance with the present disclosure.

FIG. 1 is a schematic representation of a network device 100 (e.g., a router, switch, firewall, and the like) that can be adapted in accordance with the present disclosure. In some embodiments, for example, network device 100 can include a management module 102, one or more I/O modules 106a-106p, and a front panel 110 of I/O ports (physical interfaces, I/Fs) 110a-110n. Management module 102 can constitute the control plane (also referred to as a control layer or simply the CPU) of network device 100 and can include one or more management CPUs 108 for managing and controlling operation of network device 100 in accordance with the present disclosure. Each management CPU 108 can be a general-purpose processor, such as an Intel®/AMD® x86, ARM® microprocessor and the like, that operates under the control of software stored in a memory device/chips such as ROM (read-only memory) 124 or RAM (random-access memory) 126. The control plane provides services that include traffic management functions such as routing, security, load balancing, analysis, and the like.

The one or more management CPUs 108 can communicate with storage subsystem 120 via bus subsystem 130. Other subsystems, such as a network interface subsystem (not shown in FIG. 1), may be on bus subsystem 130. Storage subsystem 120 can include memory subsystem 122 and file/disk storage subsystem 128. Memory subsystem 122 and file/disk storage subsystem 128 represent examples of non-transitory computer-readable storage devices that can store program code and/or data, which when executed by one or more management CPUs 108, can cause one or more management CPUs 108 to perform operations in accordance with embodiments of the present disclosure.

Memory subsystem 122 can include a number of memories such as main RAM 126 (e.g., static RAM, dynamic RAM, etc.) for storage of instructions and data during program execution, and ROM (read-only memory) 124 on which fixed instructions and data can be stored. File storage subsystem 128 can provide persistent (i.e., non-volatile) storage for program and data files, and can include storage technologies such as solid-state drive and/or other types of storage media known in the art.

Management CPUs 108 can run a network operating system stored in storage subsystem 120. A network operating system is a specialized operating system for network device 100. For example, the network operating system can be the Arista EOS® operating system, which is a fully programmable and highly modular, Linux-based network operating system, developed and sold/licensed by Arista Networks, Inc. of Santa Clara, California. Other network operating systems may be used.

Bus subsystem 130 can provide a mechanism for the various components and subsystems of management module 102 to communicate with each other as intended. Although bus subsystem 130 is shown schematically as a single bus, alternative embodiments of the bus subsystem can utilize multiple buses.

The one or more I/O modules 106a-106p can be collectively referred to as the data plane of network device 100 (also referred to as data layer, forwarding plane, etc.). Interconnect 104 represents interconnections between modules in the control plane and modules in the data plane. Interconnect 104 can be a PCIe (Peripheral Component Interconnect Express) bus or any other suitable bus architecture (e.g., SMBus (System Management Bus), I2C (Inter-Integrated Circuit), etc.). I/O modules 106a-106p can include respective packet processing hardware comprising packet processors 112a-112p and memory hardware 114, to provide packet processing and forwarding capability. Each I/O module 106a-106p can be further configured to communicate over one or more ports 110a-110n on the front panel 110 to receive and forward network traffic. Packet processors 112a-112p can comprise hardware (circuitry), including for example, data processing hardware such as an ASIC (application specific integrated circuit), FPGA (field programmable array), digital processing unit, and the like, and forwarding lookup hardware, including for example, content addressable memory such as TCAMs (ternary CAMs) and auxiliary memory such as SRAMs (static RAM). Memory hardware 114 can include the buffers used for queueing packets. I/O modules 106a-106p can access memory hardware 114 via crossbar 118. It is noted that in other embodiments, the memory hardware 114 can be incorporated into each I/O module. The forwarding hardware in conjunction with the lookup hardware can provide wire speed decisions on how to process ingress packets and outgoing packets for egress. In accordance with some embodiments, some aspects of the present disclosure can be performed wholly within the data plane.

In some embodiments, one or more packet processors 112a-112p can include ECMP engine 142 to provide ECMP forwarding in accordance with the present disclosure. This aspect of the present disclosure will now be discussed in more detail.

Referring to FIGS. 2A, 3A, 3B, and 4, the discussion will turn to a description of an ECMP engine 200 in accordance with some embodiments of the present disclosure. Various information contained in or otherwise associated with a received (ingress) packet 22 can be provided to ECMP engine 200, including for example packet data fields 24 contained in the ingress packet, an ingress port (I/F) identifier 26 that identifies the port on which the packet was received, and destination information 28 that indicates the destination of the ingress packet 22. In some embodiments, for example, the destination information can comprise the destination internet protocol (IP) address contained in the ingress packet. In some embodiments, where the network device supports virtual routers, destination information 28 can also include a virtual routing and forwarding (VRF) identifier that identifies the VRF (also referred to as virtual router) that received the ingress packet.

Figure 2A:
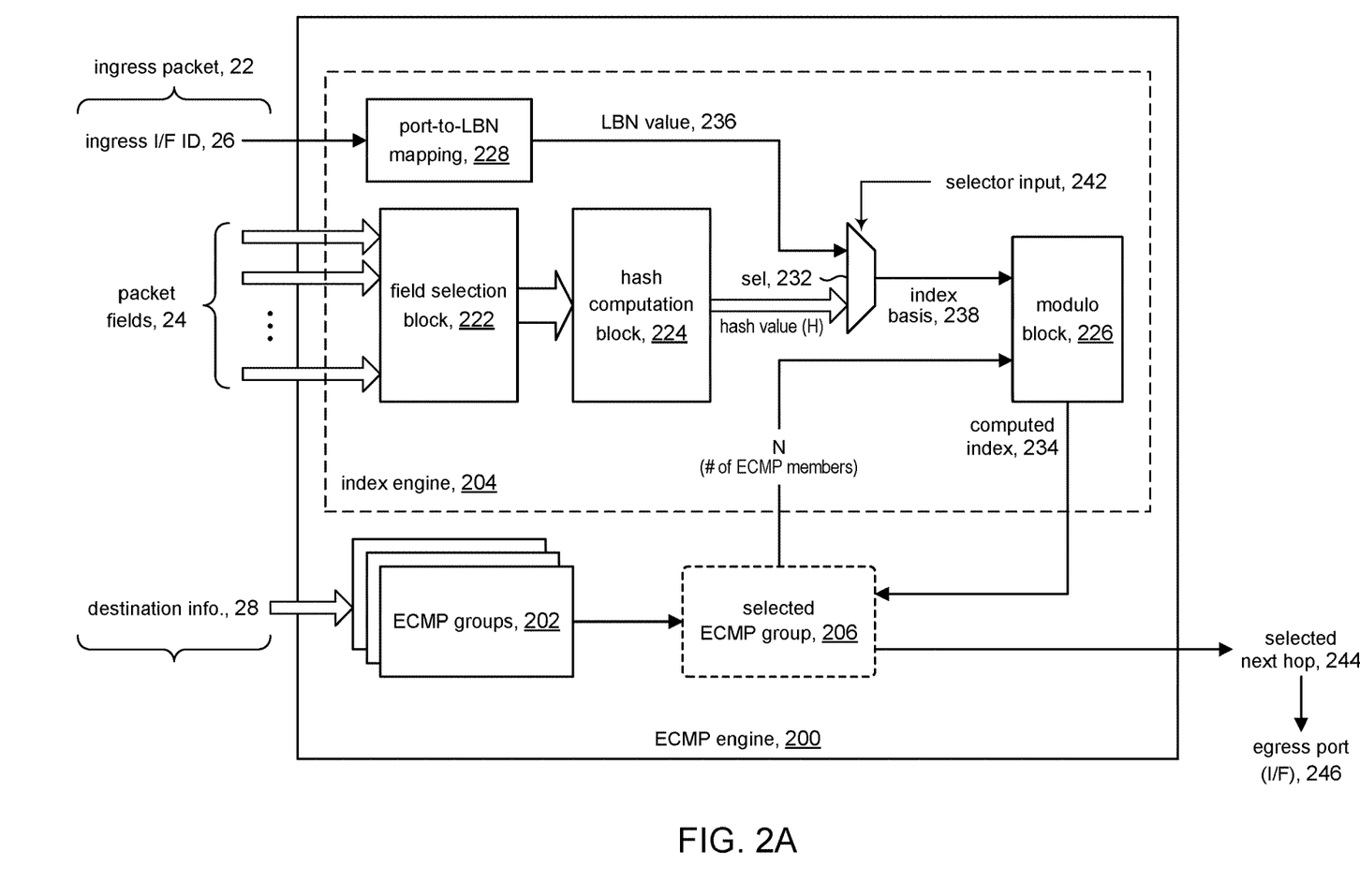
FIGS. 2A and 2B illustrate examples of port-based forwarding in accordance with embodiments of the present disclosure.
Figure 3A:
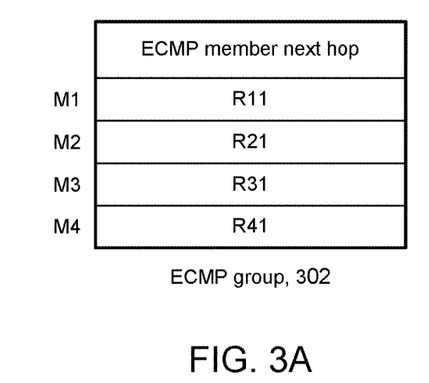
FIGS. 3A and 3B illustrate an example of an ECMP group.
Figure 3B:
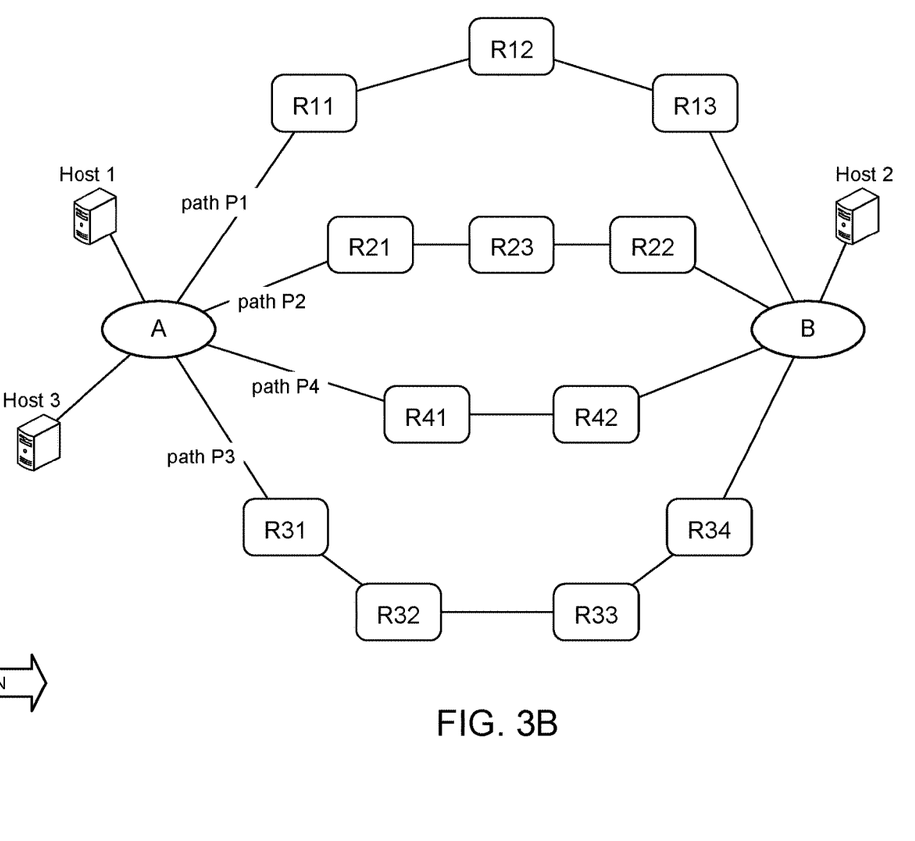

ECMP engine 200 can include a set of ECMP groups 202; e.g., stored in suitable memory such as RAM. Each ECMP group corresponds to a destination in the network to which a received packet can be sent; members of the ECMP group are the next hops to that destination. FIG. 2A shows an ECMP group 206 selected based on destination information 28. Referring for a moment to FIGS. 3A and 3B, a representation of an ECMP group 302 (e.g., in the forwarding information base of the network device) is shown, showing four members M1-M4 (a 4-way ECMP). Each member in the ECMP group represents a next hop to a path between node A (e.g., a gateway) and node B (e.g., another gateway), where a host connected to node A (or B) can send packets to a host connected to node B (or A). Member M1, for example, represents the next hop device R11 on path P1 comprising a link from node A to node R11, a link from node R11 to node R12, a link from R12 to R13, and a link from R13 to node B. Likewise, member M2 the next hop device R21 on path P2 comprising a link from node A to node R21, a link from R21 to R22, a link from R22 to R23, and a link from R23 to node B; and similarly with with member M3 and M4.

Continuing with FIG. 2A, ECMP engine 200 can include index engine 204. In some embodiments, index engine 204 can include a hash component comprising a field selection block 222 and a hash computation block 224. The field selection block 222 can comprise circuitry (e.g., FPGA, processor, etc.) configured to receive packet data fields 24 and output one or more selected data fields to the hash computation block 224. The hash computation block can comprise circuitry (e.g., FPGA, processor, etc.) configured to compute a hash value (H) from the selected data fields and output the computed hash value to selector 232.

Figure 4:
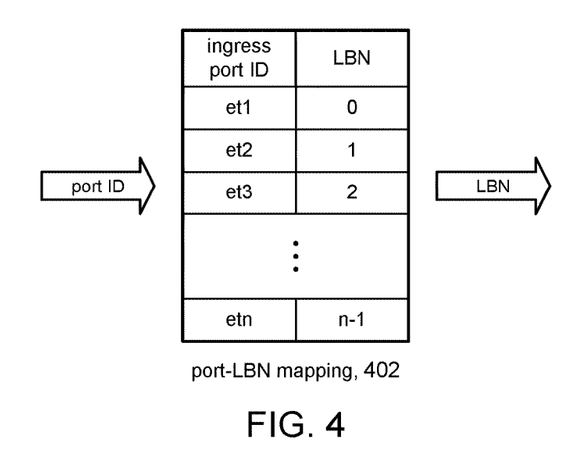
FIG. 4 represents a port-to-LBN mapping table.

In accordance with the present disclosure, index engine 204 can further comprise a port-to-load balancing number (LBN value) mapping block 228. In accordance with the present disclosure, the mapping block 228 can comprise circuitry (e.g., FPGA, processor, etc.) configured to map the identifier of a port on the network device to a corresponding LBN value. More particularly, the mapping block can map the identifier of the ingress port of ingress packet 22 to obtain an LBN value 236 that can be output to selector 232. Referring for a moment to FIG. 4, port-LBN mapping table 402 represents an example of mapping information that the mapping block 228 can use to map a port identifier to a corresponding LBN value. The port-LBN mapping table 402 can be configured by a user (e.g., network administrator) or by an automated process. Various mapping permutations are possible. In some embodiments, for example, each port identifier (ID) can be mapped to a unique LBN value. In other embodiments, two or more port IDs can map to the same LBN value, and so on.

The selector 232 (e.g., a multiplexer circuit, mux) can be operated by selector input 242 to selectively output, as index basis 238, either the hash value H or the LBN value 236. The index basis 238 can be used as the basis for selecting an ECMP member from the selected ECMP group 206. In some embodiments, for example, the index basis 238 can be a input to a modulo computation block 226 to produce a computed index 234.

The modulo computation block 226 can comprise circuitry (e.g., FPGA, processor, etc.) configured to perform a modulo operation (also referred to as the remainder operation). In accordance with some embodiments, the modulo block 226 can compute H MOD N, where H is the index basis 238 and N refers to the number of ECMP members in the selected ECMP group 206; for example, the example ECMP group 302 in FIG. 3A contains four members, so N for ECMP group 306 is four. The modulo block 226 can output computed index 234 to select a next hop 244 from the selected ECMP group 206. The port on the network device to which the selected next hop is connected serves as the egress port 246 on which to forward the received packet 22.

Figure 2B:
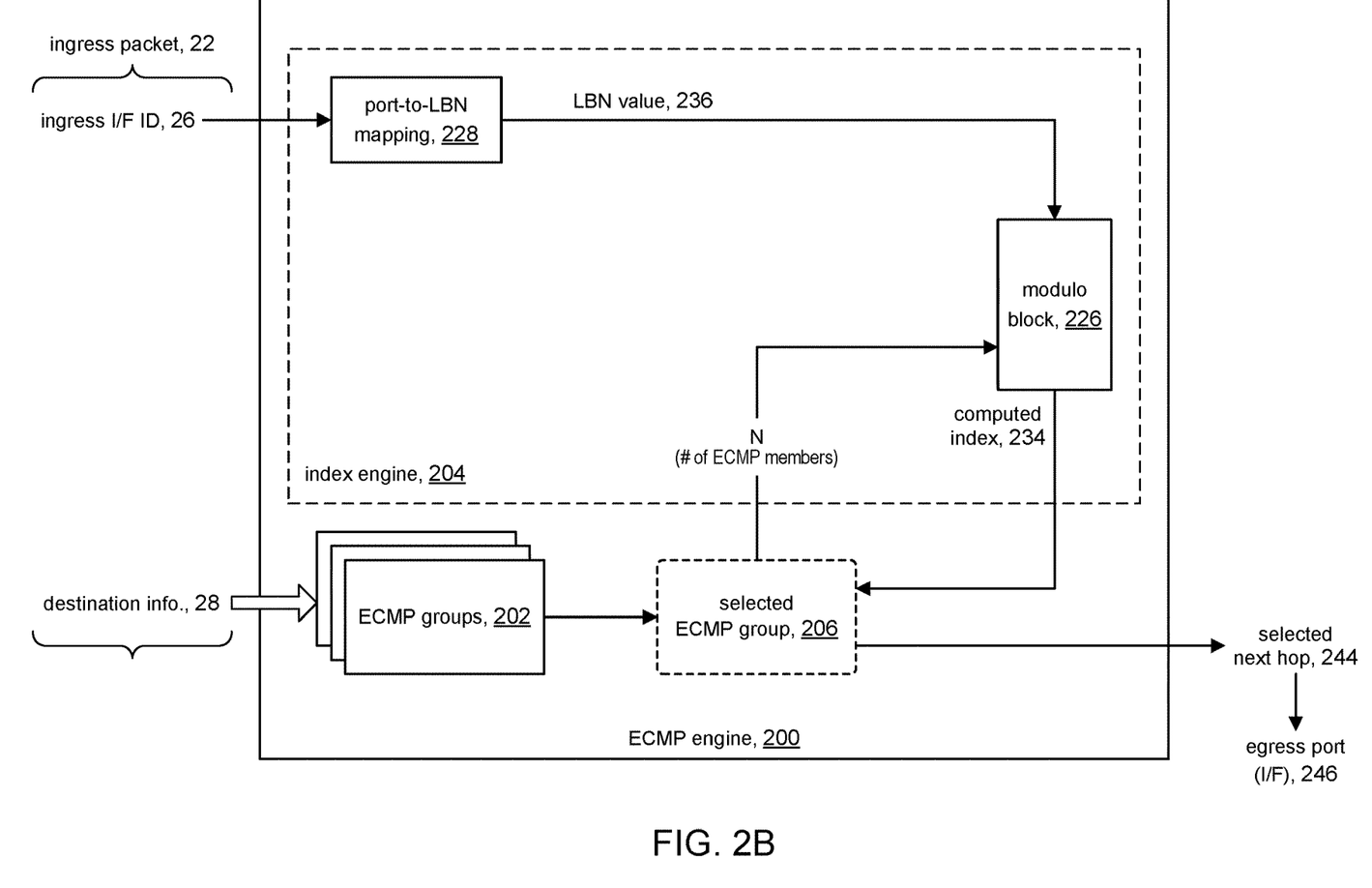

The embodiment shown in FIG. 2A represents a configuration that allows a user (e.g., network administrator) to configure operation of the network device for hash-based ECMP forwarding (where the hash index 234 is the index basis for selecting the next hop), or port-based ECMP forwarding according to the present disclosure (where the LBN value 236 is the index basis for selecting the next hop). In some embodiments in accordance with the present disclosure, the hash-based processing block can be omitted from the index engine 202, resulting in a simplified index engine comprising only the mapping block 228. FIG. 2B illustrates an example of such an embodiment, where ECMP engine 200' includes an index engine 202' comprising only the port to LBN mapping block 228.

Figure 5:
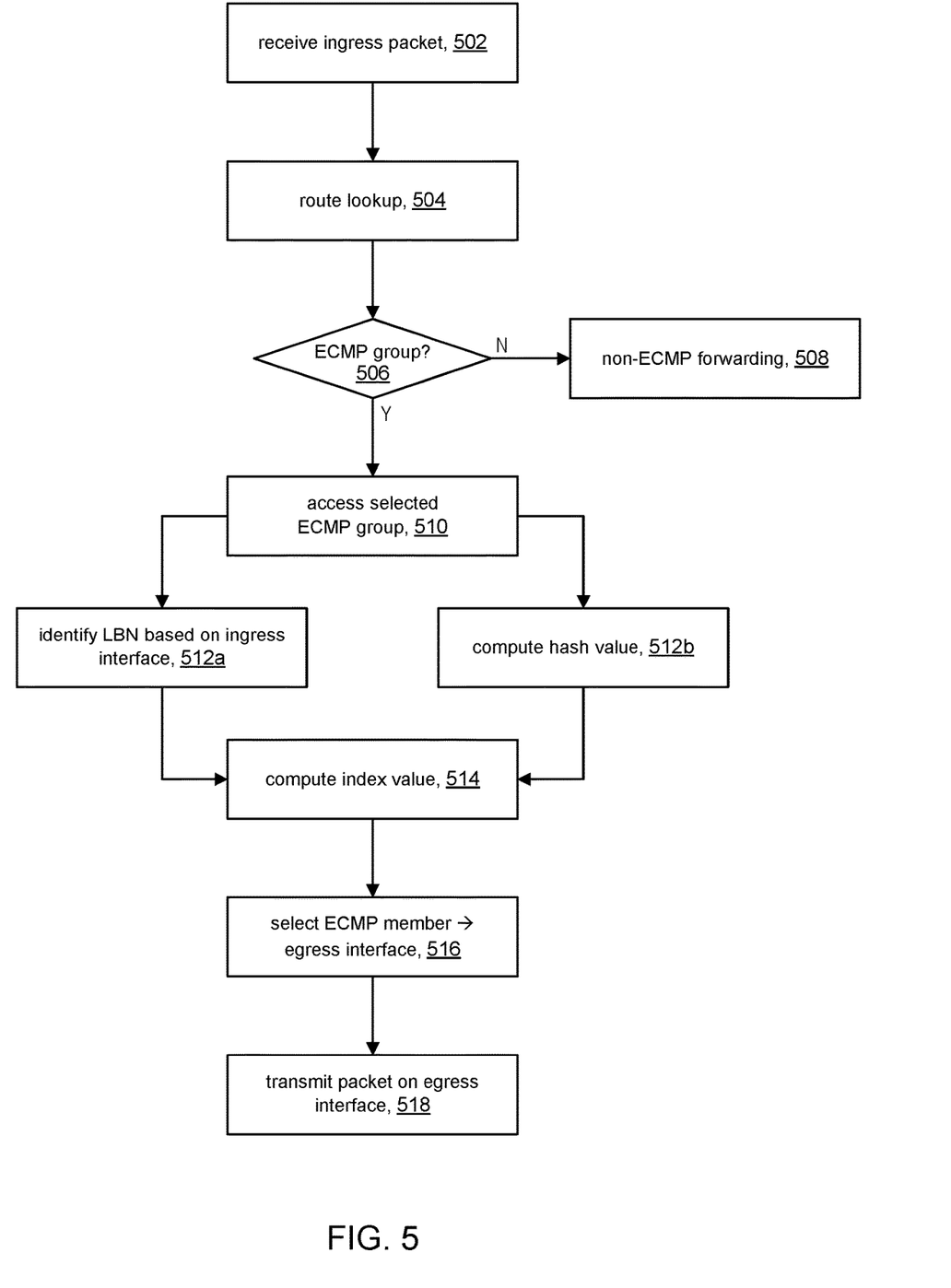
FIG. 5 represents operations in accordance with the present disclosure.

Referring to FIG. 5, the discussion will now turn to a high-level description of processing in a network device (e.g., 100, FIG. 1) for ECMP forwarding in accordance with the present disclosure. In some embodiments, for example, the network device can include one or more digital processing units (circuits), which when operated, can cause the network device to perform processing in accordance with FIG. 5. In some embodiments, the digital processing units (circuits) can refer to the control plane and can include general CPUs that operate by way of executing computer program code stored on a non-volatile computer readable storage medium (e.g., read-only memory); for example, CPU 108 in the control plane (FIG. 1) can be a general CPU. In some embodiments, the digital processing units (circuits) can refer to the data plane and can include specialized processors such as digital signal processors, field programmable gate arrays, application specific integrated circuits, and the like, that operate by way of executing computer program code or by way of logic circuits being configured for specific operations. For example, each of packet processors 112a-112p in the data plane (FIG. 1) can be a specialized processor. The operation and processing blocks described below are not necessarily executed in the order shown. Operations can be combined or broken out into smaller operations in various embodiments. Operations can be allocated for execution among one or more concurrently executing processes and/or threads.

At operation 502, the network device can receive a packet (ingress packet) for a given flow on one of the ports (ingress port) of the network device. In some embodiments, where the network device supports virtual routers (VRFs), the ingress port can be a virtual port on one of the virtual routers.

At operation 504, the network device can perform a route lookup to determine the direct next hop or an ECMP group that is used to pick one of the next hops.

At decision point 506, processing can proceed to operation 508 or operation 510 depending on whether the destination information in the ingress packet is associated with an ECMP group. In some embodiments, for example, the destination IP address contained in the ingress packet can be used to select or otherwise identify the ECMP group. In some embodiments, where the network device can instantiate multiple virtual routers (referred to as VRFs), the selected ECMP group may be further based on the VRF on which the ingress packet was received. If there is no ECMP group, then processing can continue to operation 508 to perform regular, non-ECMP forwarding of the ingress packet, after which processing the ingress packet can be deemed complete. If there is an ECMP group, then processing can proceed to operation 510.

At operation 510, the network device can access the ECMP group (e.g., ECMP group 206, FIG. 2A) associated with the destination information in the ingress packet.

At operation 512a, where the network device is configured for port-based forwarding, the network device can identify a load-balancing number (LBN value) based on the ingress port. In some embodiments in accordance with the present disclosure, for example, a port identifier of each port on the network device can be associated with or otherwise mapped to an LBN value, such as shown in mapping table 402 in FIG. 4 where the port identifier of the ingress port can be used to identify a corresponding LBN value. For port-based forwarding, the LBN can serve as the basis (e.g., index basis 238) for selecting an ECMP member, as discussed below.

At operation 512b, where the network device is configured for hash-based forwarding, the network device can compute a hash value based on one or more data fields of the ingress packet. In some embodiments, the data fields can comprise the 5-tuple derived from the ingress packet, namely the source IP address and source L4 port number, the destination IP address and destination L4 port number, and the IP type. It will be appreciated that in other embodiments, the data fields can comprise any portion of the ingress packet, such as, for example, source MAC address, destination MAC address, virtual local area network identifier (VLAN ID), etc. In some embodiments, the hash value can be based on packet processing pipeline metadata such as ingress interface number. It will be understood that any suitable hash algorithm can be used such as, but not limited to, 32-bit cyclic redundancy check (CRC-32), CRC-16, XOR16, and XOR1. For hash-based forwarding, the computed hash value can serve as the basis (e.g., index basis 238) for selecting an ECMP member, as discussed below.

At operation 514, an index value can be computed from the index basis determined at operation 512a or operation 512b. In some embodiments, the index value can be computed by the modulo operation H MOD N, where H is the index basis and N represents the number of members in the selected ECMP group. As noted above, the index basis can be either the LBN value computed at operation 512a or the hash value computed at operation 512b.

At operation 516, the computed index value can be used to select an ECMP member from the selected ECMP group. In some embodiments, for instance, the members in the selected ECMP group can be ordered, in which case the $i^{th}$ member in the ECMP group can be the selected member, where i is the computed index value. The selected member represents the next hop device. The interface (port) that is connected to the next hop device can be deemed the egress interface.

At operation 518, the network device can forward the received packet on the egress interface determined at operation 516. It will be appreciated, that in some embodiments the received packet may be edited according to one or more access control list (ACL) rules prior to being forwarded.

Figure 6A:
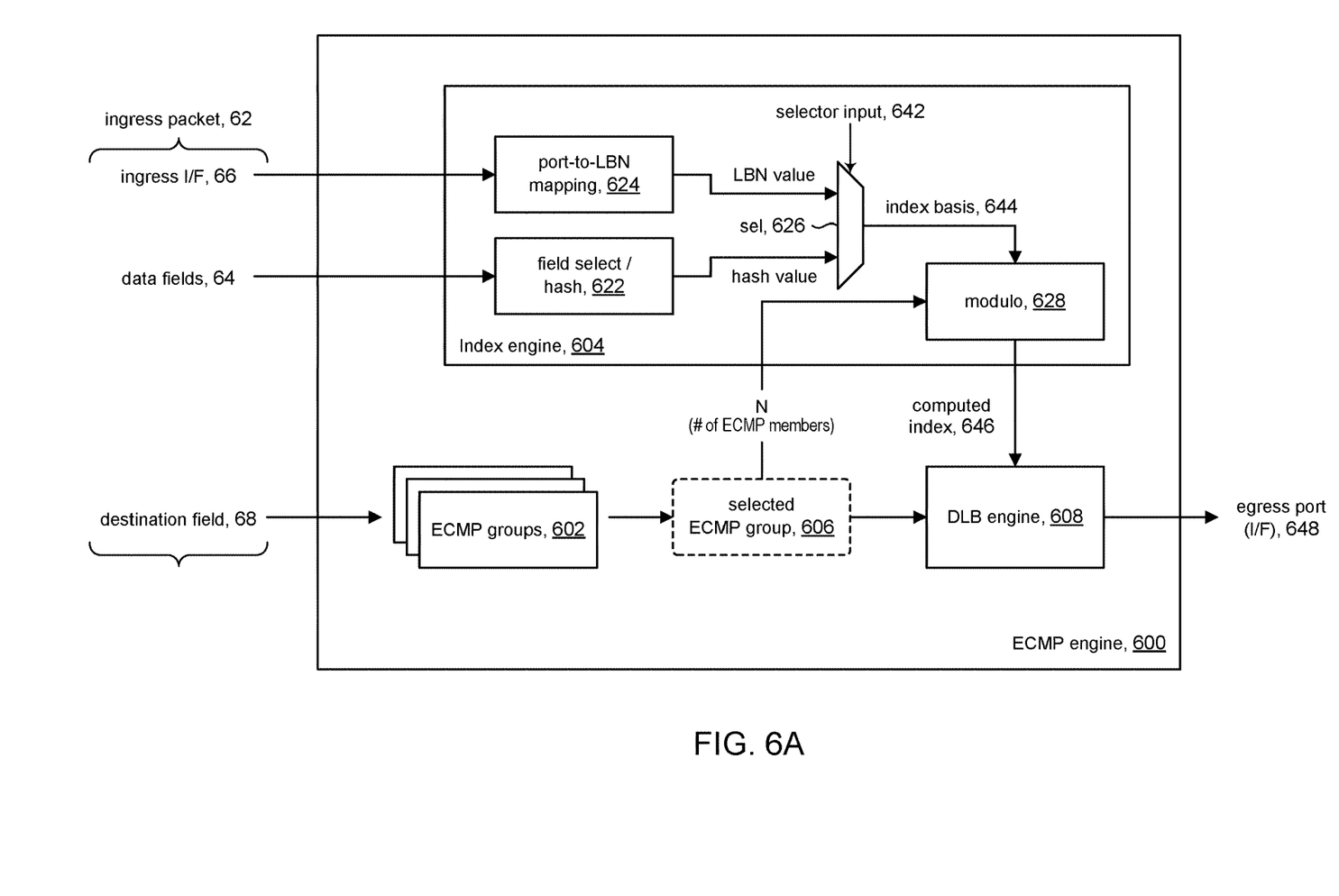
FIGS. 6A and 6B illustrate examples of port-based forwarding in accordance with additional embodiments of the present disclosure.

Referring to FIG. 6A, embodiments in accordance with the present disclosure can be applied to network devices that include dynamic load balancing (DLB) capability. The discussion will turn to a description of an ECMP engine 600 in accordance with some embodiments of the present disclosure.

Similar to the ECMP engine shown in FIG. 2A, various information contained in or otherwise associated with a received (ingress) packet 62 can be provided to ECMP engine 600, including for example packet data fields 64 contained in the ingress packet, an ingress port (I/F) identifier 66 that identifies the port on which the packet was received, and destination information 68 that indicates the destination of the ingress packet 62. In some embodiments, for example, the destination information can comprise the destination internet protocol (IP) address contained in the ingress packet. In some embodiments, where the network device supports virtual routers, destination information 68 can also include a virtual routing and forwarding (VRF) identifier that identifies the VRF (also referred to as virtual router) that received the ingress packet.

ECMP engine 600 can include a set of ECMP groups 602; e.g., stored in suitable memory such as RAM. Each ECMP group corresponds to a destination in the network to which a received packet can be sent, and comprises a set of next hops to that destination (see for example FIGS. 3A and 3B). FIG. 6A shows an ECMP group 606 selected based on destination information 68.

ECMP engine 600 can include index engine 604. In some embodiments, index engine 604 can include a hash component 622 configured to select data fields in the ingress packet and compute a hash using the selected data fields. The hash component 622 can include a field selection block and a hash computation block such as shown in FIG. 2A, for example. The field selection block can comprise circuitry (e.g., FPGA, processor, etc.) configured to receive packet data fields 64 and output one or more selected data fields to the hash computation block. The hash computation block can comprise circuitry (e.g., FPGA, processor, etc.) configured to compute a hash value (H) from the selected data fields and output a computed hash value to selector 626.

In accordance with the present disclosure, index engine 604 can further comprise a port-to-load balancing number (LBN value) mapping block 624. In accordance with the present disclosure, the mapping block 624 can comprise circuitry (e.g., FPGA, processor, etc.) configured to map the identifier of a port on the network device to a corresponding LBN value. More particularly, the mapping block can map the identifier of the ingress port of ingress packet 62 to obtain an LBN value that can be output to selector 626. See for example, the detail shown in FIG. 4.

The selector 626 (e.g., a mux) can be operated by selector input 642 to selectively output, as index basis 644, either the hash value or the LBN value. The index basis 644 can be used as the basis for selecting an ECMP member from the selected ECMP group 606. In some embodiments, for example, the index basis 644 can be an input to a modulo computation block 628 to produce a computed index 646.

The modulo computation block 628 can comprise circuitry (e.g., FPGA, processor, etc.) configured to perform a modulo operation (also referred to as the remainder operation). In accordance with some embodiments, the modulo block 628 can compute H MOD N, where H is the index basis 644 and N refers to the number of ECMP members in the selected ECMP group 606. The modulo block 628 can output computed index 646 to DLB engine 608.

DLB engine 608 can receive the computed index 646 and the selected ECMP group 606. Briefly, the DLB engine maintains an internal table (FIG. 9) that is partitioned into regions, where each region corresponds to a respective ECMP group. The DLB engine can be configured to track utilization of the links represented by the selected ECMP group 606. The computed index 646 can access a slot in the region of the internal table that corresponds to the selected ECMP group 606. If the slot is empty, the DLB engine can dynamically load the empty slot with a member selected from the ECMP group 606. In some embodiments, the selected ECMP member can be the member with the least amount of traffic being transmitted and/or with a lower number of packets enqueued against it. If there are multiple ECMP members satisfying those conditions, then the tie can be broken by random selection or other suitable tie-breaking mechanism. The selected ECMP member represents the next hop from which the egress port can be determined.

Figure 6B:
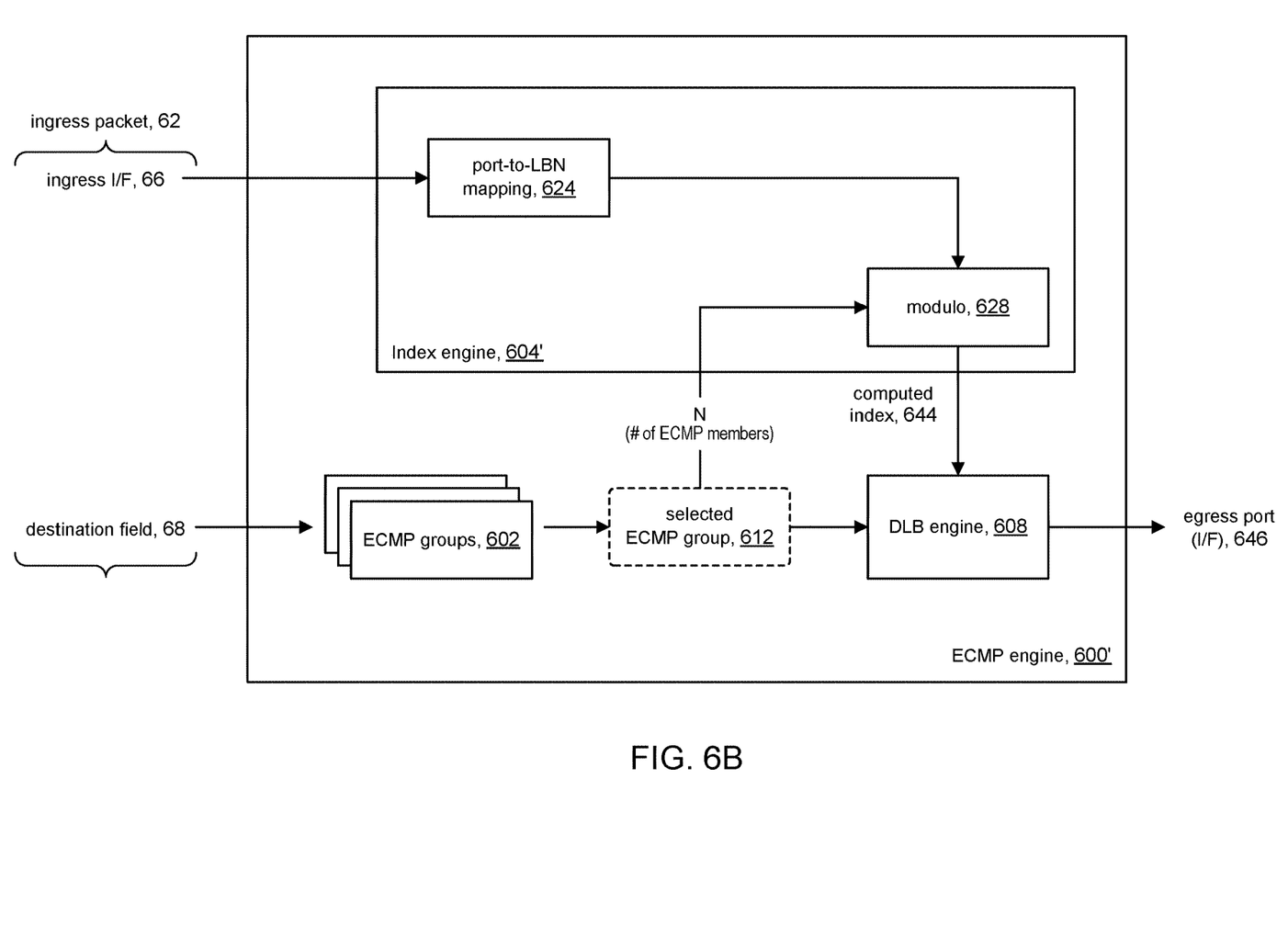

The embodiment shown in FIG. 6A represents a configuration that allows the user to configure operation of the network device for hash-based ECMP forwarding according to conventional techniques or port-based ECMP forwarding according to the present disclosure. In some embodiments in accordance with the present disclosure, the hash-based processing block can be omitted from the index engine 604, resulting in a simplified index engine comprising only the mapping block 624. FIG. 6B illustrates an example of such an embodiment, where ECMP engine 600' includes an index engine 604' comprising only the port to LBN mapping block 624.

Figure 7:
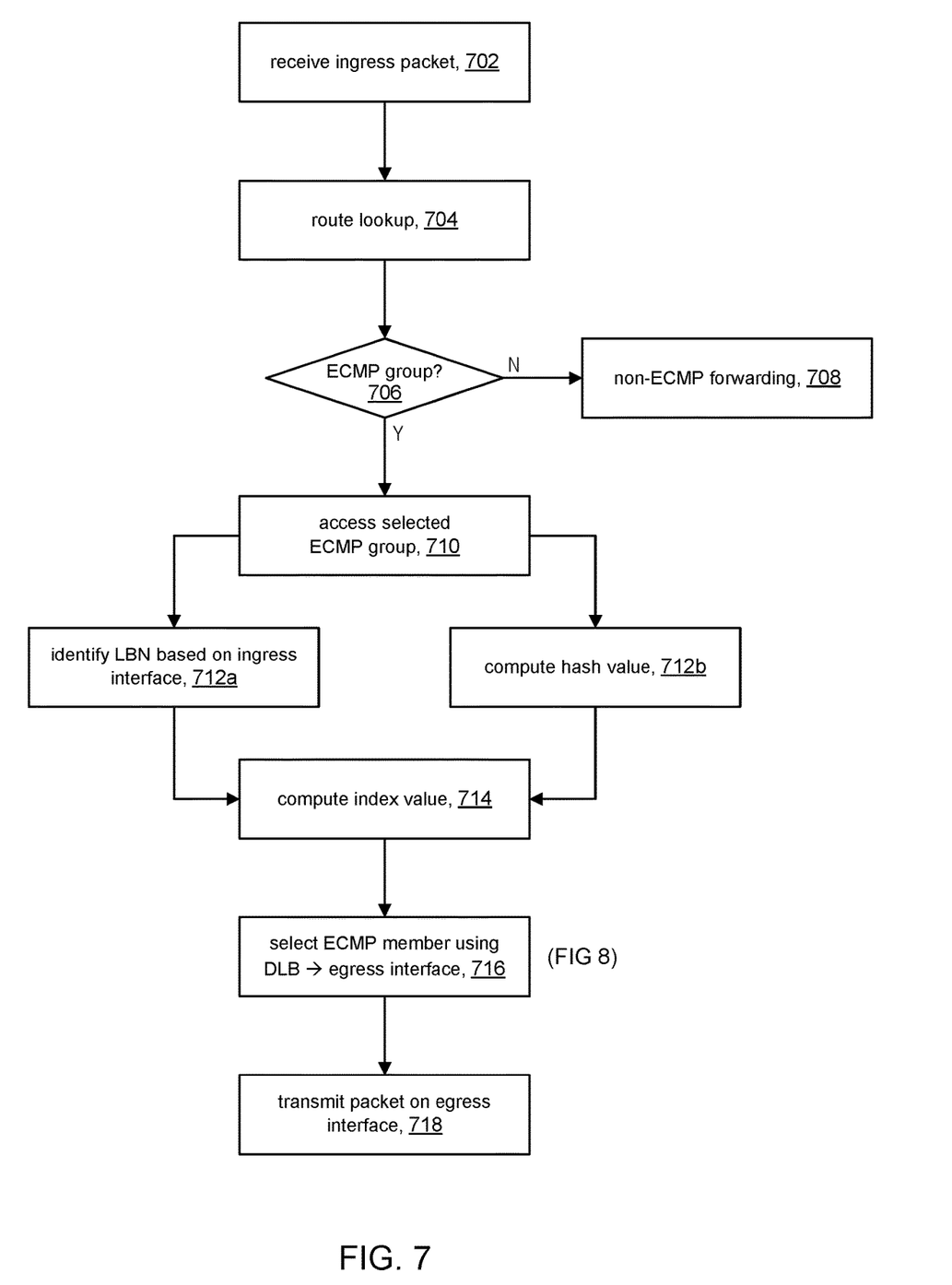
FIGS. 7 and 8 represent operations in accordance with the present disclosure.

Referring to FIG. 7, the discussion will now turn to a high-level description of processing in a network device (e.g., 100, FIG. 1) for ECMP forwarding in accordance with the present disclosure. In some embodiments, for example, the network device can include one or more digital processing units (circuits), which when operated, can cause the network device to perform processing in accordance with FIG. 7. In some embodiments, the digital processing units (circuits) can refer to the control plane and can include general CPUs that operate by way of executing computer program code stored on a non-volatile computer readable storage medium (e.g., read-only memory); for example, CPU 108 in the control plane (FIG. 1) can be a general CPU. In some embodiments, the digital processing units (circuits) can refer to the data plane and can include specialized processors such as digital signal processors, field programmable gate arrays, application specific integrated circuits, and the like, that operate by way of executing computer program code or by way of logic circuits being configured for specific operations. For example, each of packet processors 112a-112p in the data plane (FIG. 1) can be a specialized processor. The operation and processing blocks described below are not necessarily executed in the order shown. Operations can be combined or broken out into smaller operations in various embodiments. Operations can be allocated for execution among one or more concurrently executing processes and/or threads.

At operation 702, the network device can receive a packet (e.g., ingress packet 62) for a given flow on one of the ports (ingress port) of the network device. In some embodiments, where the network device supports virtual routers (VRFs), the ingress port can be a virtual port on one of the virtual routers.

At operation 704, the network device can perform a route lookup.

At decision point 706, processing can proceed to operation 708 or operation 710 depending on whether the destination information in the ingress packet is associated with an ECMP group. In some embodiments, for example, the destination IP address contained in the ingress packet can be used to select or otherwise identify the ECMP group. In some embodiments, where the network device can instantiate multiple virtual routers (referred to as VRFs), the selected ECMP group may be further based on the VRF on which the ingress packet was received. If there is no ECMP group, then processing can continue to operation 708 to perform regular, non-ECMP forwarding of the ingress packet, after which processing the ingress packet can be deemed complete. If there is an ECMP group, then processing can proceed to operation 710.

At operation 710, the network device can access the ECMP group (e.g., ECMP group 606, FIG. 6A) associated with the destination information in the ingress packet.

At operation 712a, where the network device is configured for port-based forwarding, the network device can identify a load-balancing number (LBN value) based on the ingress port. In some embodiments in accordance with the present disclosure, for example, a port identifier of each port on the network device can be associated with or otherwise mapped to an LBN value, such as shown in mapping table 402 in FIG. 4 where the port identifier of the ingress port can be used to identify a corresponding LBN value. For port-based forwarding, the LBN can serve as the basis (e.g., index basis 238) for selecting an ECMP member, as discussed below.

At operation 712b, where the network device is configured for hash-based forwarding, the network device can compute a hash value based on one or more data fields of the ingress packet. In some embodiments, the data fields can comprise the 5-tuple of the ingress packet, namely the source IP address and source port number, the destination IP address and destination port number, and the IP type. It will be appreciated that in other embodiments, the data fields can comprise any portion of the ingress packet. It will be understood that any suitable hash algorithm can be used such as, but not limited to, 32-bit cyclic redundancy check (CRC-32), CRC-16, XOR16, and XOR1. For hash-based forwarding, the computed hash value can serve as the basis (e.g., index basis 238) for selecting an ECMP member, as discussed below.

At operation 714, an index value can be computed from the index basis determined at operation 712a or operation 712b. In some embodiments, the index value can be computed by the modulo operation H MOD N, where H is the index basis and N represents the number of members in the selected ECMP group.

At operation 716, an ECMP member from the selected ECMP group (accessed at operation 710) can be selected using dynamic load balancing (e.g., DLB engine 608) of the ECMP group. An example of DLB processing is shown in connection with FIG. 8. The selected ECMP member represents the next hop device. The interface (port) that is connected to the next hop device can be deemed the egress interface.

At operation 718, the network device can forward the received packet on the egress interface determined at operation 716. It will be appreciated, that in some embodiments the received packet may be edited according to one or more access control list (ACL) rules prior to being forwarded.

Figure 8:
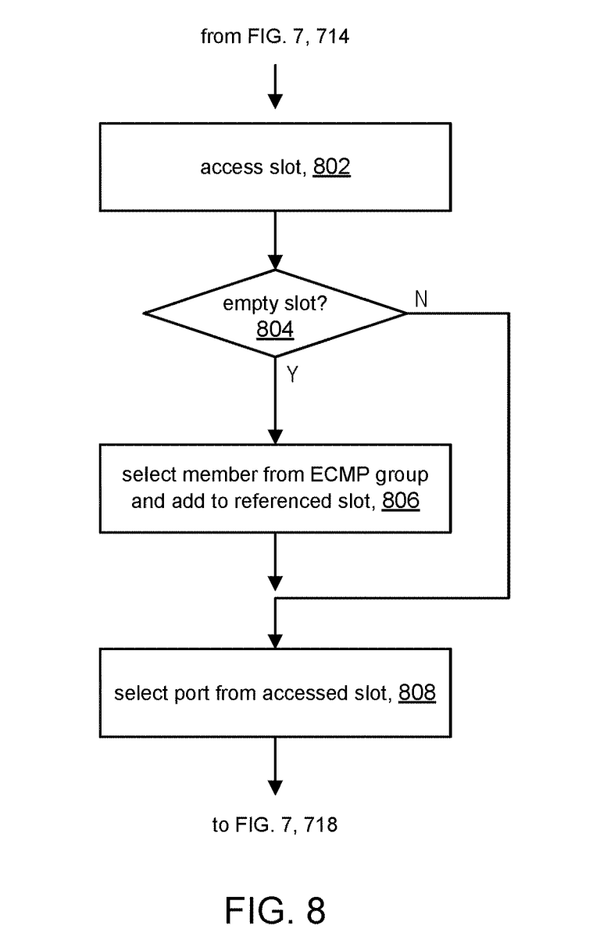

Referring to FIG. 8, the discussion will now turn to a high-level description of DLB processing (e.g., in DLB engine 608) to select an ECMP member from the selected ECMP group (e.g., 606).

Figure 9:
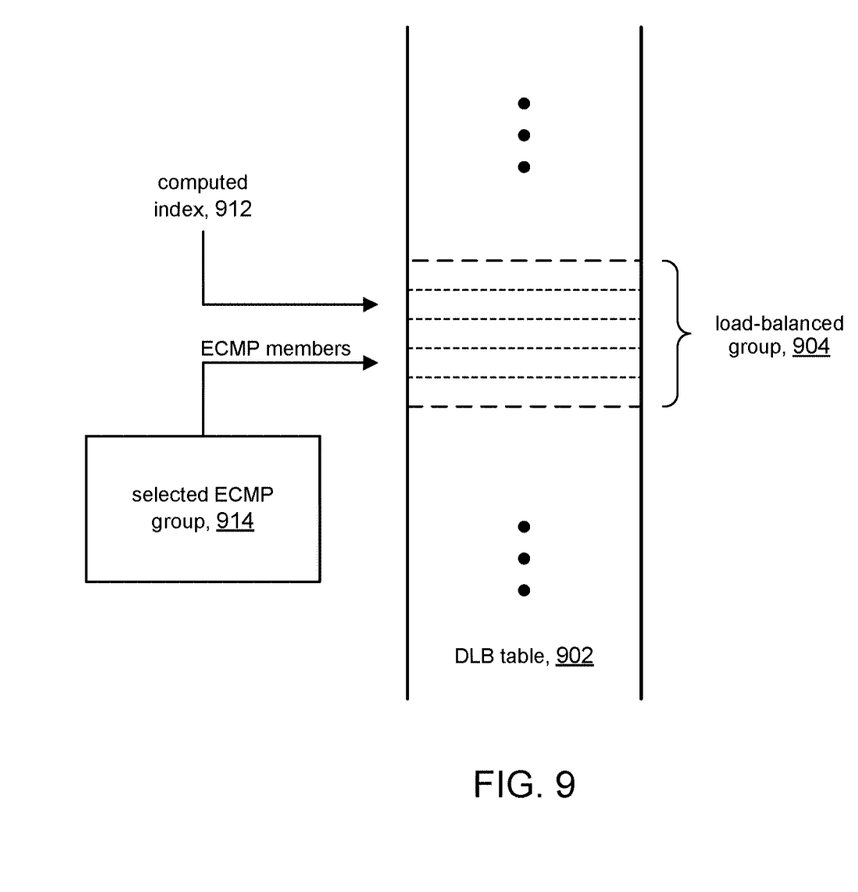
FIG. 9 illustrates an example of dynamic load balancing.

At operation 802, the DLB engine can access a slot in its internal table. As mentioned above, the DLB maintains an internal table that is organized into regions. For reasons that will become clear, each such region in the internal table will be referred to herein as a load-balanced group. Referring for a moment to FIG. 9, the figure shows a representation of an internal DLB table 902 that is partitioned or otherwise organized into load-balanced groups; one such load-balanced group 904 is illustrated. Each load-balanced group corresponds to a respective ECMP group; for example, load-balanced group 904 corresponds to the selected ECMP group 914. The load-balanced group maintains a mapping between the flow and a selected ECMP member in the ECMP group 914. By comparison, in a DLB without the LBN of the present disclosure, multiple flows destined for a given ECMP group may map to the same ECMP member. Continuing with FIG. 8, the DLB engine can access a load-balanced group that corresponds to the selected ECMP group, and use the computed index to access a slot in the accessed load-balanced group.

At decision point 804, processing can proceed according to whether the accessed slot in the load-balanced group that corresponds to the selected ECMP group is empty or non-empty. For example, the slots in the load-balanced group are initially empty. A non-empty slot can expire or age out and become empty if the port associated with the ECMP member in that slot has been idle. If the accessed slot is empty, then processing can proceed to operation 806 to fill the slot. If the accessed slot is not empty, then processing can skip operation 806 and proceed to operation 808.

At operation 806, the DLB engine can fill the accessed empty slot by selecting a member from the corresponding ECMP group and adding the selected member to the slot. For example, the ECMP member can be selected based on a level of utilization (e.g., traffic loading), the member having the lowest level of utilization can be selected. It will be appreciated, however, that other criteria can be used to select a member. Having filled the empty slot, processing can continue with operation 808.

At operation 808, the DLB engine can output the port associated with the ECMP member contained in the accessed slot. Processing can continue with operation 718 in FIG. 7.

Further Examples

Features described above as well as those claimed below may be combined in various ways without departing from the scope hereof. The following examples illustrate some possible, non-limiting combinations:

(A1) A method for selecting an egress port in a network device configured with ECMP (Equal Cost Multi-Path), the method comprising the network device: receiving a packet on a port from among a plurality of ports of the network device; determine an index value associated with the port on which the packet was received, wherein each of the plurality of ports is associated with an index value; accessing an ECMP group associated with the received packet, the ECMP group comprising ECMP members that represent next hop devices; determining a next hop from a load-balanced group comprising the ECMP members of the ECMP group, including using the index value associated with the port on which the packet was received to select a slot from among a plurality of slots of the load-balanced group, wherein the ECMP member in the selected slot represents the next hop; and forwarding the received packet on a port of the network device associated with the determined next hop.

(A2) The method denoted as (A1), further comprising computing a lookup index using H mod N, wherein H is the index value associated with the port on which the packet was received and N is the number of members in the ECMP group, wherein the computed lookup index is used to select the slot from among the plurality of slots of the load-balanced group.

(A3) The method denoted as any of (A1) through (A2), further comprising in response to the selected slot being empty: identifying an ECMP member from the ECMP group based on a level of utilization of the next hops represented by the ECMP members; and storing the ECMP member in the selected slot, wherein the identified ECMP member represents the next hop.

(A4) For the method denoted as any of (A1) through (A3), the load-balanced group is initially empty.

(A5) The method denoted as any of (A1) through (A4), further comprising deleting an ECMP member from a slot in the load-balanced group when the ECMP member in the slot ages out.

(A6) The method denoted as any of (A1) through (A5), further comprising selecting the ECMP group from a plurality of ECMP groups based on a destination of the received packet.

(A7) The method denoted as any of (A1) through (A6), further comprising computing a hash value based on content of the received packet, wherein determining the next hop from the load-balanced group uses either: the index value associated with the port on which the packet is received, when the network device is operating in a first configuration, or the hash value, when the network device is operating in a second configuration.

(B1) A network device comprising: a plurality of ports; one or more computer processors; a computer-readable storage device comprising instructions for controlling the one or more computer processors to: receive a packet on one of the plurality of ports of the network device; access an ECMP group associated with the received packet, the ECMP group comprising ECMP members that represents next hops to a destination of the received packet; determine a next hop from a load-balanced group comprising the ECMP members of the ECMP group, including using an index value associated with the port on which the packet was received to select a slot from among a plurality of slots of the load-balanced group, wherein the ECMP member in the selected slot represents the next hop; and forward the received packet on a port of the network device associated with the determined next hop.

(B2) For the network device denoted as (B1), the network device further comprises a port-to-index mapping table, wherein the computer-readable storage device further comprises instructions for controlling the one or more computer processors to identify the index value from the port-to-index mapping table based on the port on which the packet was received.

(B3) For the network device denoted as any of (B1) through (B2), the computer-readable storage device further comprises instructions for controlling the one or more computer processors to compute a lookup index using H mod N, wherein H is the index value associated with the port on which the packet was received and N is the number of members in the ECMP group, wherein the computed lookup index is used to select the slot from among the plurality of slots of the load-balanced group.

(B4) For the network device denoted as any of (B1) through (B3), the computer-readable storage device further comprises instructions for controlling the one or more computer processors to respond to the selected slot being empty by: identifying an ECMP member from the ECMP group based on a level of utilization of the next hops represented by the ECMP members; and storing the identified ECMP member in the selected slot, wherein the identified ECMP member represents the next hop.

(B5) For the network device denoted as any of (B1) through (B4), the load-balanced group is initially empty.

(B6) For the network device denoted as any of (B1) through (B5), the computer-readable storage device further comprises instructions for controlling the one or more computer processors to delete an ECMP member from a slot in the load-balanced group when the ECMP member in the slot ages out.

(B7) For the network device denoted as any of (B1) through (B6), the computer-readable storage device further comprises instructions for controlling the one or more computer processors to select the ECMP group from a plurality of ECMP groups based on a destination of the received packet.

(B8) For the network device denoted as any of (B1) through (B7), the computer-readable storage device further comprises instructions for controlling the one or more computer processors to select the egress table from a plurality of egress tables based on a destination of the received packet.

(B9) For the network device denoted as any of (B1) through (B8), the computer-readable storage device further comprises instructions for controlling the one or more computer processors to: compute a hash value based on content of the received packet; and determine the next hop from the load-balanced group using either: the index value associated with the port on which the packet is received, when the network device is operating in a first configuration, or the computed hash value, when the network device is operating in a second configuration.

(C1) A method for selecting an egress port in a network device configured with ECMP forwarding, the method comprising: receiving a packet on one of the plurality of ports of the network device; accessing an ECMP group from a plurality of ECMP groups, the accessed ECMP group comprising a plurality of next hops to the destination; identifying a member in the accessed ECMP group based on the port on which the packet was received; forwarding the received packet on a port of the network that can reach the next hop associated with the identified member in the accessed ECMP group.

(C2) For the method denoted as (C1), identifying the member in the accessed ECMP group comprises: identifying a value that is mapped to the port on which the packet was received; computing an index using H mod N, wherein H is the mapped value and N is the number of members in the accessed ECMP group; and using the index to identify the member in the accessed ECMP group.

(C3) The method denoted as any of (C1) through (C2), further comprising: computing a hash value based on content of the packet; and identifying a member in the accessed ECMP group based on: (1) the port on which the packet is received when the network device is operating in a first configuration; or (2) the hash value when the network device is operating in a second configuration.

(C4) The method denoted as any of (C1) through (C3), further comprising selecting the ECMP group from the plurality of ECMP groups based on a destination of the received packet.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method for selecting an egress port in a network device configured with ECMP (Equal Cost Multi-Path), the method comprising the network device:
receiving a packet on a port from among a plurality of ports of the network device;
determining an index value associated with the port on which the packet was received, wherein each of the plurality of ports is associated with an index value;
accessing an ECMP group associated with the received packet, the ECMP group comprising ECMP members that represent next hop devices;
determining a next hop from a load-balanced group comprising the ECMP members of the ECMP group, the determining of the next hop comprising:

accessing a slot from among a plurality of slots of a load-balanced group comprising the ECMP members of the ECMP group, the slot being associated with the index value;

upon determining that the slot is populated with an ECMP member of the ECMP group, determining that the ECMP member in the slot is the next hop; and upon determining that the slot is empty:
   identifying an ECMP member of the ECMP group based on one or more criteria;
   storing the identified ECMP member in the slot; and
   upon storing the identified ECMP member in the slot, determining that the identified ECMP member is the next hop; and forwarding the received packet on a port of the network device associated with the next hop.

2. The method of claim 1, further comprising computing a lookup index using H mod N, wherein H is the index value associated with the port on which the packet was received and N is the number of ECMP members in the ECMP group, wherein the computed lookup index is used to select the slot from among the plurality of slots of the load-balanced group.

3. The method of claim 1 wherein the one or more criteria include levels of utilization of the ECMP members of the ECMP group.

4. The method of claim 1, wherein the load-balanced group is initially empty.

5. The method of claim 1, further comprising deleting an ECMP member from a slot in the load-balanced group when the ECMP member in the slot ages out.

6. The method of claim 1, further comprising selecting the ECMP group from a plurality of ECMP groups based on a destination of the received packet.

7. The method of claim 1, further comprising computing a hash value based on content of the received packet, wherein determining the next hop from the load-balanced group uses either:
   the index value associated with the port on which the packet is received, when the network device is operating in a first configuration, or
   the hash value, when the network device is operating in a second configuration.

8. A network device comprising:
a plurality of ports;
one or more computer processors;
a computer-readable storage device comprising instructions for controlling the one or more computer processors to:
   receive a packet on one of the plurality of ports of the network device;
   access an ECMP group associated with the received packet, the ECMP group comprising ECMP members that represents next hops to a destination of the received packet;
   determine a next hop from a load-balanced group comprising the ECMP members of the ECMP group by:
      accessing a slot from among a plurality of slots of a load-balanced group comprising the ECMP members of the ECMP group, the slot being associated with an index value associated with the port on which the packet was received;
      upon determining that the slot is populated with an ECMP member of the ECMP group, determining that the ECMP member in the slot is the next hop; and
      upon determining that the slot is empty:
         identifying an ECMP member of the ECMP group based on one or more criteria;
         storing the identified ECMP member in the slot; and
         upon storing the identified ECMP member in the slot, determining that the identified ECMP member is the next hop; and
   forward the received packet on a port of the network device associated with the next hop.

9. The network device of claim 8, wherein the network device further comprises a port-to-index mapping table, wherein the computer-readable storage device further comprises instructions for controlling the one or more computer processors to identify the index value from the port-to-index mapping table based on the port on which the packet was received.

10. The network device of claim 8, wherein the computer-readable storage device further comprises instructions for controlling the one or more computer processors to compute a lookup index using H mod N, wherein H is the index value associated with the port on which the packet was received and N is the number of members in the ECMP group, wherein the computed lookup index is used to select the slot from among the plurality of slots of the load-balanced group.

11. The network device of claim 8, wherein the one or more criteria include levels of utilization of the ECMP members of the ECMP group.

12. The network device of claim 8, wherein the load-balanced group is initially empty.

13. The network device of claim 8, wherein the computer-readable storage device further comprises instructions for controlling the one or more computer processors to delete an ECMP member from a slot in the load-balanced group when the ECMP member in the slot ages out.

14. The network device of claim 8, wherein the computer-readable storage device further comprises instructions for controlling the one or more computer processors to select the ECMP group from a plurality of ECMP groups based on a destination of the received packet.

15. The network device of claim 8, wherein the computer-readable storage device further comprises instructions for controlling the one or more computer processors to select the ECMP group from a plurality of ECMP groups based on a destination of the received packet.

16. The network device of claim 8, wherein the computer-readable storage device further comprises instructions for controlling the one or more computer processors to:
   compute a hash value based on content of the received packet; and
   determine the next hop from the load-balanced group using either:
      the index value associated with the port on which the packet is received, when the network device is operating in a first configuration, or
      the computed hash value, when the network device is operating in a second configuration.

17. A method for selecting an egress port in a network device configured with ECMP forwarding, the method comprising:
   receiving a packet on one of the plurality of ports of the network device;
   accessing an ECMP group from a plurality of ECMP groups, the accessed ECMP group comprising a plurality of next hops to the destination;
   computing a hash value based on one or more portions of the received packet;
   determining a value associated with the port on which the packet is received;

retrieving a configuration specified by a user of the network device that indicates whether the network device should perform hash-based ECMP forwarding or port-based ECMP forwarding;

selecting, based on the retrieved configuration, either the hash value or the value associated with the port as an index value for the received packet;

identifying a member in the accessed ECMP group based on the index value; and forwarding the received packet on a port of the network that can reach the next hop associated with the identified member in the accessed ECMP group.

18. The method of claim 17, wherein identifying the member in the accessed ECMP group comprises:

computing an index using H mod N, wherein H is the index value and N is the number of members in the accessed ECMP group; and using the index to identify the member in the accessed ECMP group.

19. The method of claim 17, further comprising selecting the ECMP group from the plurality of ECMP groups based on a destination of the received packet.

* * * * *